United States Patent [19]

Green et al.

[11] Patent Number: 4,768,221
[45] Date of Patent: Aug. 30, 1988

[54] REMOTE REPROGRAMMING SYSTEM FOR TELEPHONE CALL FORWARDING SERVICE

[75] Inventors: Dan Green, Cranford, N.J.; Sandor Goldner, Brooklyn, N.Y.

[73] Assignee: Planum Technology Corp., Hillside, N.J.

[21] Appl. No.: 920,773

[22] Filed: Oct. 20, 1986

[51] Int. Cl.[4] .......................... H04M 1/65; H04M 3/54
[52] U.S. Cl. ........................................ 379/67; 379/211
[58] Field of Search .................... 379/67, 95, 102, 105, 379/210, 211, 212

[56] References Cited

U.S. PATENT DOCUMENTS

| | | | |
|---|---|---|---|
| 3,702,904 | 11/1972 | Bard | 379/105 |
| 3,885,108 | 5/1975 | Zock. | |
| 4,413,158 | 11/1983 | Danford | 379/211 |
| 4,475,009 | 10/1984 | Rais et al. | 379/211 |
| 4,601,011 | 7/1986 | Grynberg | 379/95 X |
| 4,626,623 | 12/1986 | LaHaye | 379/95 |
| 4,626,630 | 12/1986 | Waldman | 379/211 X |
| 4,670,900 | 6/1987 | Waldman | 379/211 |
| 4,677,663 | 6/1987 | Szlam | 379/211 |

OTHER PUBLICATIONS

Glasgal Communications, Inc., "Data Communications Equipment and Supplies", Summer Catalog 1985, pp. 68-71.

Primary Examiner—Keith E. George
Attorney, Agent, or Firm—Helfgott & Karas

[57] ABSTRACT

A device for remotely controlling call forwarding for a given telephone line. The device includes a detection circuit for detecting an incoming call to the given telephone line. If it detects only one or two signals indicating a previous call forwarding initiate setting, it automatically terminates call forwarding and awaits input of a new call forwarding telephone number followed by a security code. If it detects more than four rings, it knows that the call forwarding was not enabled and it is ready to accept the new call forwarding number remotely input along with the security code. After receiving successfully the remotely inserted call forwarding number and security code, it proceeds to reprogram the system with the new call forwarding number. Should any unauthorized user be using the system, it will reprogram with the previously stored call forwarding number.

30 Claims, 4 Drawing Sheets

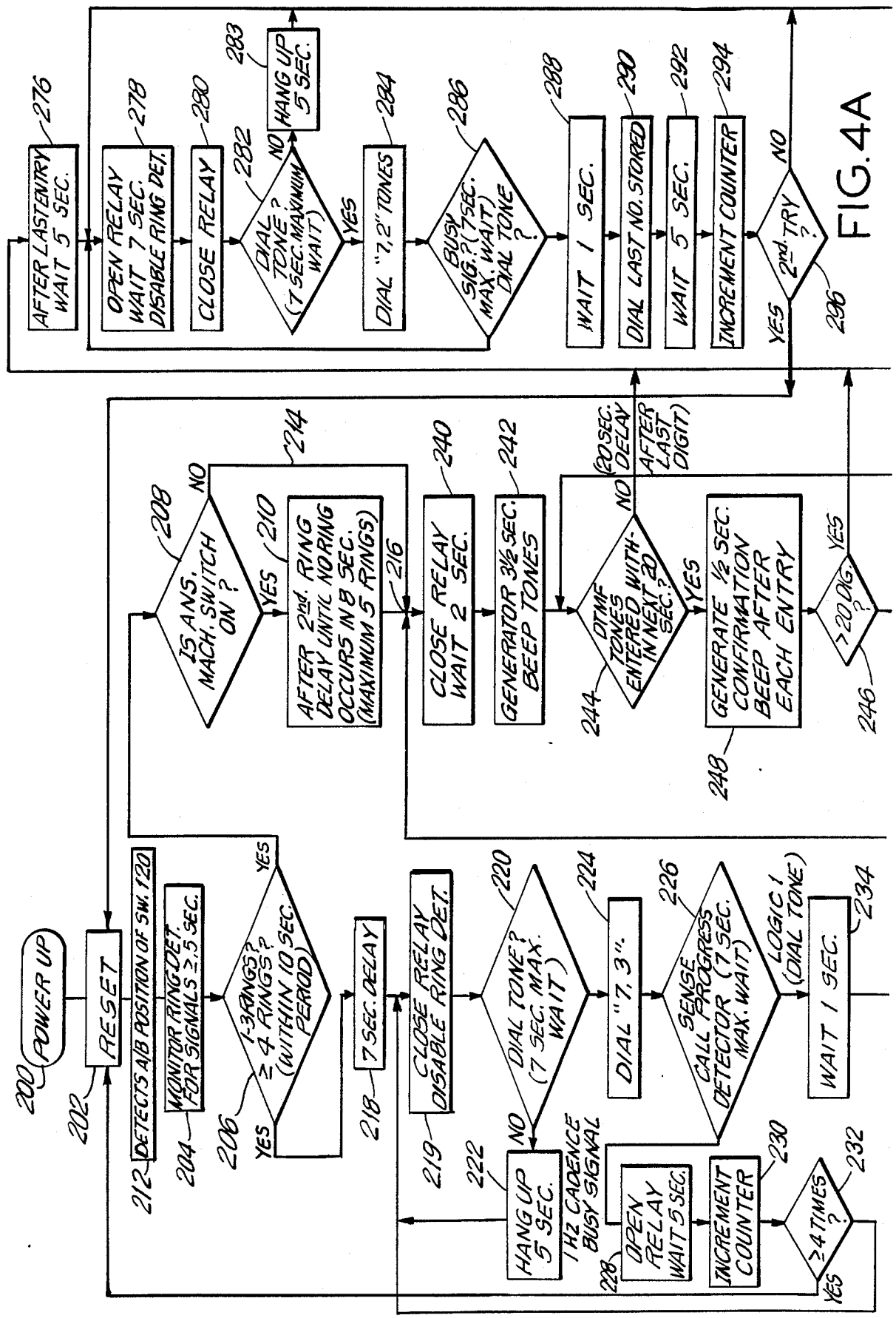

REMOTE REPROGRAMMING SYSTEM FOR TELEPHONE CALL FORWARDING SERVICE

BACKGROUND OF THE INVENTION

This invention relates to telephone apparatus, and more particularly, to a method and apparatus for remotely controlling call forwarding for a given telephone line.

Call forwarding is presently offered as an optional service from the telephone company for telephone users. In using such call forwarding service, one must initiate call forwarding. One system being offered by telephone companies requires the dialing of a call forwarding initiate code "72" onto the telephone line and then waiting for a dial tone to appear in approximately 5 seconds. After this, the call forwarding telephone number is entered onto the line. The telephone system responds with two beeps followed by the ringing of the forwarding number. If the telephone at the call forwarding number is then picked up, the call forwarding function is initiated. If, on the other hand, the call forwarding number is busy or no one picks up, the user must hang up his local phone and repeat the process. The repeating of the process automatically brings the two beep response followed by a dial tone and this time the call forwarding function is automatically initiated.

In order to terminate call forwarding, one must dial the call forwarding terminate code "73" onto the telephone line, wait for two beeps followed by a dial tone. This indicates that the call forwarding function has been automatically terminated.

While call forwarding is useful, at present both initiation and termination of the call forwarding option takes place at a telephone instrument which is connected to the telephone line having the call forwarding telephone service. Accordingly, if the user is at a different location and desires to change the call forwarding number as he moves from place to place, such would not be possible using standard offered equipment.

In order to provide a remotely controlled call forwarding system there is described in U.S. Pat. No. 4,475,009, issued on Oct. 1, 1984, "A Method And Device For Remotely Controlling Telephone Call Forwarding".

In the aforementioned prior art patent, the system provides a call forwarding enable detector which is set and reset based upon the particular state previously entered. Two separate sequences of remote control are provided. If the enable detector indicates that the system has not been set for call forwarding, then the user remotely follows a sequence to set a call forwarding service. The sequence involves the user dialing the number of a given telephone line. The user then inserts a predetermined identification code number. He then inserts the call forwarding telephone number. The system checks the ID number and if it is correct, it will store the forward telephone number and then proceed to dial out a call forwarding initiate code number "72" followed by the number that has just been inserted as the forward telephone number.

If the enable detector has been previously set into a call forwarding mode, then the remote user must follow a separate sequence to terminate call forwarding service. Three levels of security are described in the aforementioned patent. For a security set at zero, the requirement is to enter two telephone calls within a predetermined interval of time. The other securities provide variations on this theme. For example, security of one provides for a temporary termination after each one of the calls as long as there is provided an ID number thereafter within a fixed time. A security of two temporarily terminates after the second call if it is followed by the ID number.

Once the system detects the proper sequence for terminating a call, it will proceed to dial the termination code "73" on the line to terminate call forwarding.

If a remote user wants to change the system from one call forwarding to the other he must first follow the sequence to terminate call forwarding and then independently follow the sequence for setting a new call forwarding.

It is therefore apparent that the remote user must know the previous state of the system. If the user assumes that there is no call forwarding that has been set and therefore proceeds to set a call forwarding signal when in fact the call forwarding detector actually indicates that there was a previous setting, the system will not operate properly. The user will be entering an ID number when the system is actually looking for two calls within a previous fixed period of time. Similarly, if the user believes that a number has been stored, and that the system is in fact in a call forwarding mode, and the user remotely goes to terminate when actually no call forwarding service has been entered, the system is looking for an ID number and the user is redialing within a predetermined interval of time. Therefore, no terminate signal will be sent and no new number will be entered.

Similarly, in order to change from one number to another number, it is necessary for the user to proceed into a first sequence requiring termination of the previous code and then a separate sequence initiating a new call forwarding code. This is quite a time consuming process and also requires the user to remember the complexities of the system.

Other problems with the aforementioned system concerns the possibility of others tampering with the system. If unauthorized individuals are aware that the given telephone line is equipped with call forwarding service, they may attempt to call in and try to insert various ID numbers in an attempt to break the code and thereby redirect all calls to an unauthorized call forwarding number. There is not method in the aforementioned system to detect any such tampering and to advise the user of attempts by unauthorized individuals to invade his system.

Accordingly, while the aforementioned patent provides a proposed system for remotely controlling call forwarding on a given telephone line, the system involves complexities which adversely effect the successful use of such as system.

SUMMARY OF THE INVENTION

The present invention provides an improvement over the aforementioned patent by using a different overall approach to remotely control the call forwarding of a given line. The approach taken is to have the system automatically determine whether it is in a terminate for call forwarding mode and appropriately direct the user remotely so that he can proceed based upon the response of the system to his dialing into the given telephone line. There is no need to provide a separate call forwarding enable detector which is set or reset. The system inherently can determine whether it is in a call forwarding mode or not and so advise the user remotely.

Specifically, when the system is in a call forwarding mode, the system will inherently only receive a limited number of rings locally prior to the call being forwarded. For example, based upon the various telephone systems, a limited number of rings such as 1-3 rings are all that are heard locally and the call is automatically forwarded. On the other hand, when call forwarding has not been initiated, the phone will continue ringing locally. Accordingly, a ring detector on the system counting the number of rings can automatically determine whether it is in a call forwarding or non call forwarding mode. Based upon its detection, it will advise the user remotely by providing various signals on the telephone line to indicate whether he can immediately proceed to enter the call forwarding number or must call back a second time and then enter the call forwarding number.

A second feature is that once in the call forwarding mode, the system will automatically send a terminate signal upon each and every incoming call. Following such call, it waits a predetermined time for a second call. Should no second call arrive, thereby indicating that the first call was an actual proper incoming call from a third party, the system will reprogram itself into a call forwarding mode and reprogram with the last number stored as the call forwarding number.

On the other hand, should a second call be received within a predetermined interval of time, it will accept those numbers as a new call forwarding number and store them. Again, the system will reprogram. However, this time it will reprogram itself in a call forwarding mode and use the newly inserted call forwarding number.

Further features of the system concern the tamper proof capabilities of the system. For example, following remote entry of the new call forwarding number, the authorized user must enter a security code. The security code can be manually set by the user himself on the device and reset at will to avoid the ability of others knowing the code to continue using it.

Additionally, should the wrong security code be entered by an unauthorized user, or should no security code be entered, the system automatically reprograms call forwarding with the last stored number. Also, it keeps track of the number of times an unauthorized or wrong security code is entered and after a preset number of tries, it actually disables the entire system and provides an indication on the device that someone attempted to tamper with the device. At the same time, entry of the authorized security code remotely before a fixed number of wrong attempts or resetting of the system manually, will reset the system to permit to to again be remotely controlled.

The system also will automatically reprogram the last stored number should no new number be entered within a preset waiting period after a first call comes in. Likewise, it will reprogram with the old number if more than a fixed number of digits relating to a new call forwarding number are entered. Additionally, if an excessive delay occurs between each of the digits of the new call forwarding number, the system will likewise automatically reprogram with the last stored number.

Additional features include the ability to acknowledge busy signals on the line when trying to enter a call forwarding initiate or terminate code thereby permitting the system to try again a few times until the line is free and then be sure to insert the initiate or terminate code in the accordance with the user's requirements.

Additionally, a switch is provided to accommodate different call forwarding systems having different signal requirements. With the switch in one position, the unit dials the control code preceded by the asterisk ("*") code. In the other position, these codes are followed by the octothorpe ("#") code.

By means of these features, the remote programming system for call forwarding becomes a usable and highly useful device for those having call forwarding service on their given telephone line and permits the user to make good use of such service from the telephone companies.

Accordingly, it is an object of the present invention to provide a remote programming system for telephone company call forwarding service which avoids the problems of prior art devices.

Another object of the present invention is to provide a method and apparatus for remotely controlling the call forwarding service on a given telephone line.

A further object of the present invention is to provide an improved remote reprogramming system for call forwarding which has enhanced security protection to avoid unauthorized tampering with the system.

Still another object of the present invention is to provide a remote reprogramming system for call forwarding sevice which does not require the user to remember multiple sequences of operation for terminating and initiating call forwarding service.

Briefly, in accordance with the present invention, there is provided a device for remote control of call forwarding for a given telephone line. The device includes detecting circuitry which can detect an incoming call to the given telephone line. In response to detecting such call, a generating circuit generates a call forwarding terminate code. A circuit also detects a second incoming call within a preselected time of the first incoming call. A storage means is provided for storing a desired call forwarding telephone number. A reprogramming circuit generates a call forwarding initiate code and thereafter reprograms call forwarding with the number stored in the storage means.

In accordance with standard telephone practice, when programmed for call forwarding only a fixed number of rings occurs on the given telephone line before the call is forwarded. The detecting circuitry therefore includes a ring counter for counting the number of rings on the incoming call. A first circuit produces a response upon receiving no more than the fixed number of rings. The generating circuit is responsive only to this first circuit output for generating the terminate code. In that case, the system awaits receipt of a new telephone call forwarding number which can be stored. If such new number is received, followed by the appropriate security code, the reprogramming circuit will then reprogram call forwarding with the new telephone number. Should no new telephone number be received, the reprogramming circuit will reprogram call forwarding with the previously stored telephone number.

There is also provided a second circuit responsive to more than the fixed number of rings thereby indicating that call forwarding has not been initiated on the telephone line. In such case, it immediately awaits a new telephone number followed by the security code. Again, should that be received, the new number will be stored and the reprogramming will send out the call forwarding initiate code with the new number stored. Should no new number be received, then reprogramming will send out the initiate code with the last number previously stored in the storage medium.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWING

In the drawings.

In the various figures of the drawing, like reference characters designate like parts.

DESCRIPTION OF THE PREFERRED EMBODIMENT

Figure 1:
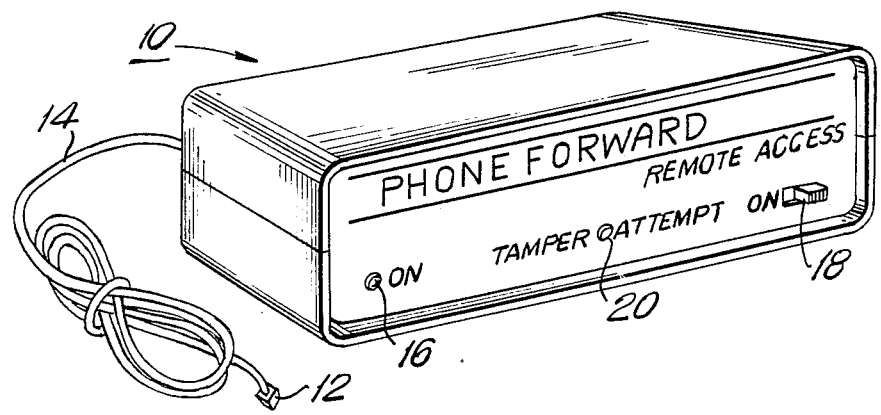
FIG. 1 is a front perspective view of the device for remotely controlling call forwarding for a given telephone line in accordance with an embodiment of the present invention.

The call forwarding system of the present invention is shown generally in FIG. 1 built into a housing 10 in the form of a rectangular unit. A modular plug 12 at the end of a telephone cord 14 extends from the back of the unit for insertion into a modular jack on the given telephone line.

The front of the unit includes an indicator bulb 16 indicating that the unit is on. An ON/OFF switch 18 is provided to turn on the unit. There is also included a tamper attempt indicator 20 which is turned on when an unauthorized user continues to try and access the given telephone line, as will hereinafter be explained.

Figure 2:
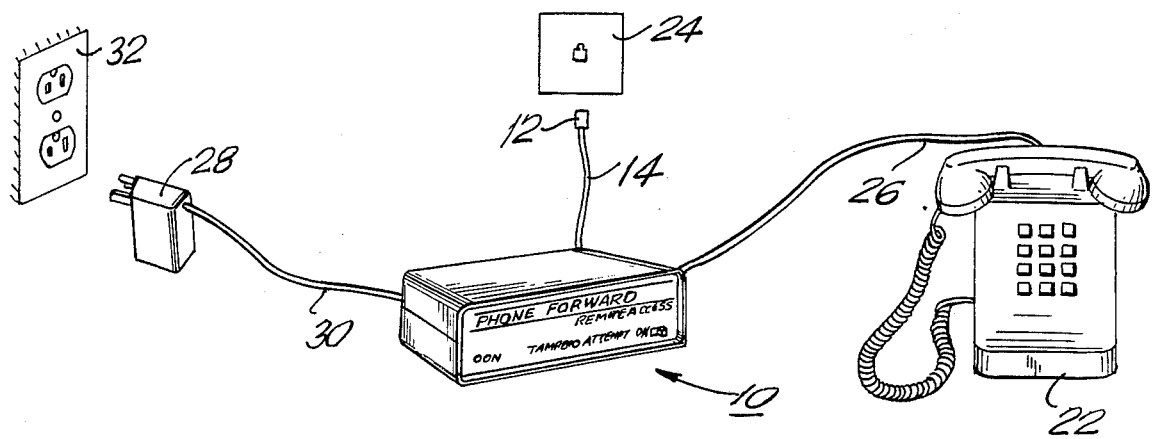
FIG. 2 is a schematic drawing showing the installation of the device of the present invention onto a given telephone line.

The installation of the unit is shown in FIG. 2. The telephone set 22 which is normally connected into the wall jack is unplugged from the wall jack 24. Instead, a telephone set is plugged into the jack marked "Ext. Tel." on the back of the unit by means of the telephone cable 26. The line 14 at the end of the remote control unit 10 is then plugged into the telephone line wall jack 24. There is also provided an AC adaptor 28 at the end of the power cord 30 which is inserted into the AC power outlet 32. The present unit also comes with a battery backup which can be inserted into the unit to retain the memory for up to a few hours during a power outage.

Figure 5:
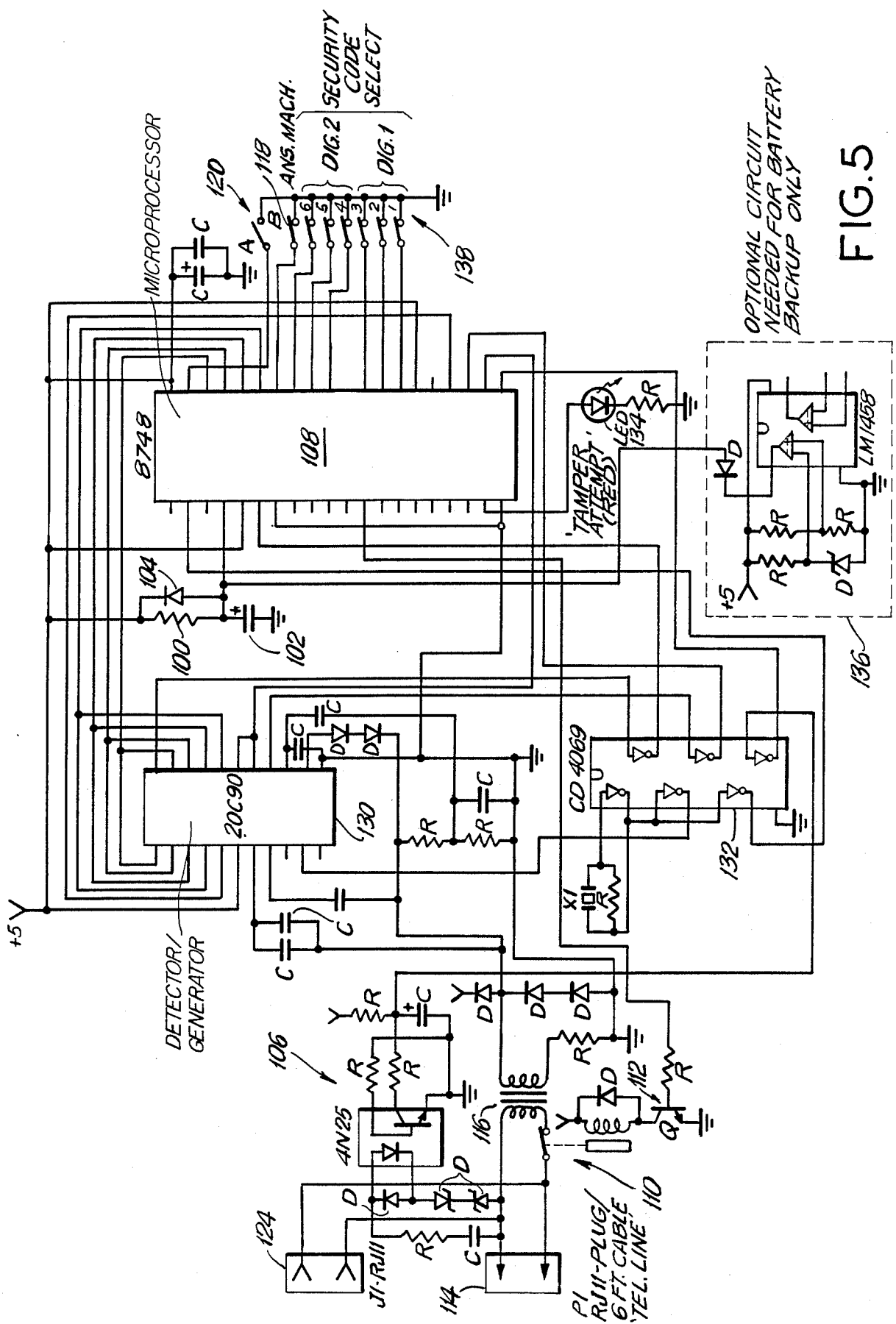
FIG. 5 is a schematic diagram of the circuitry for the remote control call forwarding system of the present invention in accordance with an embodiment of the present invention.

Referring now to FIG. 5, there is shown a schematic diagram of the circuitry of the present invention. When the system is energized, all of the circuitry and timing is cleared an initialized by a power up reset pulse generated by resistor 100 and capacitor 102. A diode 104 is in parallel across the resistor 100. The system now enters a state where the output line of ring detector 106 is monitored for signals greater than or equal to 0.5 seconds. Ring detector 106 uses a 4N25 chip. The various resistors and capacitors for the ring detector are shown. When ring signals are detected, the program residing within the fixed memory microprocessor 108 counts the number of rings. The microprocessor is indicated as chip 8748.

If call forwarding has been disabled, the number of rings coming in will continue. After a present number of rings, such as four rings, relay 110 is activated from the microprocessor through the transistor circuit 112 with appropriate resistance and diodes, as indicated. This connects the system through the typical RJ11 plug 114 across the transformer 116. Appropriate diodes and resistors are indicated across the transformer 115.

A separate switch on the extreme right, indicated as switch 118, is provided for operation on lines to which an answering machine is connected. When the switch is closed, the unit waits until the answering machine has picked up, i.e., until the ring signals have stopped, before it picks up the line to accept programming. It waits until no ring has occurred in eight seconds, which signifies that the answering machine has been activated. Alternately, it waits a maximum of 5 rings. This arrangement allows an answering machine connected to the same line to activate prior to the system connecting itself to the telephone line and thereby ensuring compatible operation of both the answering machine and the present system.

If the switch 118 is off, this means that there is no telephone answering machine connected and the system does not wait the necessary time for the answering machine to answer.

Switch 120 is provided to enable operation with different kinds of telephone company central office systems. In position A, the unit dials out the 7,2 and 7,3 control codes followed by an octothorpe ("#") code. In position B, the 7,2 and 7,3 codes are preceded by an asterisk ("*") code. Block 212, shown in FIG. 4, detects the A/B position of the switch 120.

Also included in the circuit is a detector/generator 130 shown as the circuit chip 20C90. This incorporates both a call progress detection circuit and a DTMF (Touch Tone Signal) detection and generation functions.

Other aspects of the circuit shown include the circuit chip 132 shown as chip CD4069 with its associated crystal X1 and resistor to set its proper frequency. There is also provided a light emitting diode 134, which serves as a tamper attempt indicator as heretofore shown on FIG. 1 and which will hereinafter be described. The optional circuit 136 is included for battery back-up purposes, including the circuit chip LM1458. This allows reliable operation during power outages.

A series of six switches shown generally at 138 serves as the security code select switches with the first three representing the first digit and the next three representing the second digit. The setting of these switches will be hereinafter explained in connection with the security code setting.

Figure 4B:
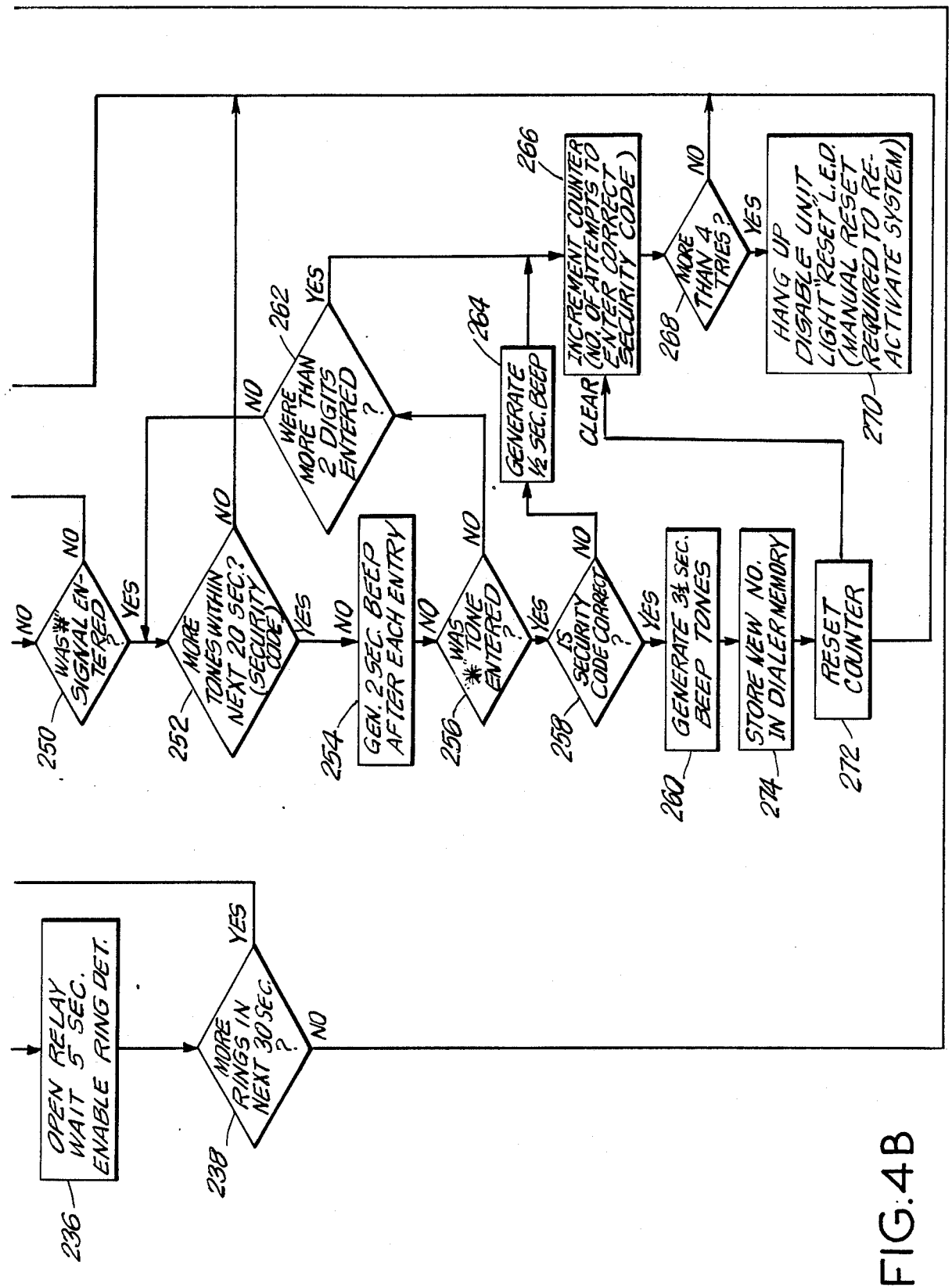
FIG. 4 is a flow chart, shown as FIGS. 4A and 4B, for the remotely controlled call forwarding system in accordance with the embodiment of the present invention.

The operation of the present circuit will best be explained by means of the flow diagram shown in FIG. 4. Initially, the system begins with a resetting pulse as shown at step 200, which serves to reset the entire system, clearing it and initializing all circuits. The system then enters a state where the output line of the ring detector 106 is monitored for signals greater than or equal to 0.5 seconds. Thus, the system begins waiting until a call is sent to the telephone line.

When ring signals are detected, the program residing within the fixed memory of microprocessor 108 counts the number of rings. If call forwarding has previously been enabled, only a fixed number of rings will be received. Typically, there is between one and three rings. If only one to three rings are received, the system inherently knows that call forwarding had previously been enabled. If call forwarding was not enabled, then the system will detect four or more rings.

When 1-3 rings are detected, a sequence of events will be initiated that will disable call forwarding and allow the system to be accessed for reprogramming, as will hereinafter the described.

The testing for the pulses as shown in block 206 and the sequence occurring if call forwarding was previously enabled is shown in the leftmost column in the figure. If call forwarding has previously not been enabled, the sequence of events occuring in the middle column occurs, as will hereinafter be explained.

If call forwarding was disabled, the rings will continue to occur. At the fourth ring, the relay 106, as shown in FIG. 5, will be activated thereby connecting the system which is now ready for programming.

The system first checks whether the switch 118 was on. This is shown in box 208 where it checks whether an answering machine has been connected. If the switch is on, the system waits until the second ring has occurred. This wait continues until no ring has occurred in eight seconds, which signifies that the answering machine has activated, or a maximum of five rings has occurred. This is shown in box 210. This arrangement allows an answering machine connected to the same telephone line to activate prior to the system connecting itself to the telephone line and insuring compatible operation of the two devices. The action of the switch 118 to enable operation with an answering machine is shown in box 208.

If the switch 118, as shown in FIG. 5 was off, then the delays above are by-passed as the line 214 goes immediately to the next box. The system is now ready for reprogramming, as will hereinafter be described.

It will be noted, that the point 216, which is the point of reprogramming, is reached both in the middle column as well as being reached from the lefthand column in case call forwarding was previously enabled. Therefore, we will proceed along the left column to reach the same point 216 now reached when the system has not been enabled.

Should 1-3 rings be received in box 206, there is indication that call forwarding was previously enabled. A sequence of actions occurs that will first disable call forwarding. Specifically, after the group of 1-3 rings occurs, a seven second delay is generated by the microprocessor 108, as shown in FIG. 5 and as is indicated in box 218. After this delay, the contacts of relay 110, as shown in FIG. 5, will close as indicated in bos 219, thus terminating the telephone line with the transformer 116, as shown in FIG. 5. Detector/generator 130, which incorporates both call progress detection and DTMF detection and generation functions, now locks for a dial tone to occur for seven seconds. These functions are shown in blocks 220 and 222. If the dial tone does not occur, as would be the case in the unlikely event that the system accidentally intercepted an incoming call, the system hangs up for five seconds, as shown at block 222. It then activates the relay again and locks for a dial tone again. This repeats until a dial tone is sensed in the form of a logic 1 signal of greater than two seconds steady duration at the detector output line when the dial tone is sensed. The microprocessor 108, in FIG. 5, will check the A/B position of the switch 120 and cause the detector/generator 130 to generate first the number "7" and then the number "3" DTMF signals, preceded by the "*" or followed by the "#" DTMF signal as determined by the setting of the A/B position of the switch 120, as is required to disable call forwarding. This is shown in block 224.

After a seven second wait, the call progress tone detector section of detector/generator 130 is activated for seven second, whereupon it will sense, during the next seven seconds, either a busy signal, in the form of a one hertz square wave, or a dial tone in the form of a logic 1 signal. This is shown in block 226.

If a busy signal occurs, the relay 110, as was shown in FIG. 5, is open for 5 seconds, as shown in block 228. A counter is incremented as shown in block 230. The above sequence is then repeated. However, the counter number is checked in block 232 to determine that the repeat has not occurred more than four times. If it is repeated more than four times, either the central office control computer is overloaded and cannot handle the disable signal, or call forwarding is already disabled. In such case, the system resets and waits for the next incoming call.

Assuming that a busy signal was not received in box 226, this means that the "73" code was then successfully entered and a dial tone occurs. After a one second wait, as shown in block 234, relay 110 is kept open for five seconds as shown in block 236, after which the ring detector is once again enabled.

If more rings occur within the next thirty seconds, as shown in block 238, the system will pick up and is ready to be reprogrammed as shown at point 216. If no calls are received in this thirty second time period, The system will attempt to reprogram the last stored number in memory, as will hereinafter be described.

Accordingly, by either of two sequences previously described, the system reaches the point 216 and will now enter the state where it is ready to be reprogrammed, as will now be described.

Firstly, the system connect relay closes, as shown at box 240. After a two second wait, three half-second beep tones are generated by detector/generator 130, as shown at box 242. The system now waits for DTMF signals to be entered from the remotely located telephone station, as shown at block 244. If no tones are entered within the next twenty seconds, or if there is a delay of more than twenty seconds occurring after a digit has been entered, or if more than twenty digits are entered, as shown at block 246, the system will again attempt to reprogram the last number stored in memory.

As signals are entered, a confirmation beep is generated upon the release of the key at the sending station, to ensure that each digit has been successfully received, as shown at block 248. After the telephone number has been entered, an octothorpe ("#") character is entered which signifies the end of the telephone number, as shown in block 250. If this number has not been entered, it again goes back to await further DTMF signals.

After the telephone number has been entered and a suitable octothorpe character was also entered, the system will interpret the next two numbers to be entered as a security code, at block 252. If no more numbers are entered within the next twenty seconds, the system will hang up and reprogram call forwarding with the last number stored in memory. On the other hand, if the proper security code is entered, as each digit is transmitted from the remote telephone, an echo beep tone will be heard as a confirmation of receipt, as shown at block 254.

After the two digits are entered, an asterisk ("*") code is entered to signify the end of the security code number, as shown at block 256.

If the security code entry sequence was correct, and the number entered corresponds with the proper two digit security code set on the device, three beep tones will be heard to confirm the entry, as shown at blocks 258 and 260. Now, after a short delay, the system hangs up and initiates a sequence of operations to program call forwarding with the newly entered number.

In order to check on the security, a number of security provisions are included. Firstly, if more than two digits are entered, the system hangs up the line immediately, giving the caller no clue as to what happened, as shown at block 262. If the wrong security code was entered, as might accidentally happen, a beep will occur as shown at block 264. This informs the user of this occurrence prior to the system hanging up.

Each time either of these events occur, the system increments a counter, at 266. If the count should exceed four tries, as shown at block 268, the system will remain incapable of activation until the system is manually reset be removal of power, as shown at block 270. Also, an indicator on the device is illuminated to advise the user that a "tamper attempt" has occurred.

Each time a correct security code sequence has been entered prior to four wrong entries, this counter is reset to zero. This is as to preclude against the user accidentally causing latch-up of the system by several wrong entries after a long period of time. This is shown at block 272.

Should the proper sequence have taken place, the new number entered is stored in the device memory as the new call forwarding telephone number, as shown at block 274.

The system may also be programmed locally by connection of a telephone set to the same telephone line paralleled with the system. After picking up the telephone set, a local push button switch is pressed four times, which simulates four rings. The system then connects to the line and generates three beeps. It may then be programmed by entering digits on the telephone key pad in exactly the same way as it would be from a remote telephone.

Referring again to FIG. 4, and specifically to the rightmost column, the operation for reprogramming will now be described. After a five second delay, as shown in block 276, the system hangs up for seven seconds and disables the ring detector, as shown at block 278. The relay 110, as was shown in FIG. 5, is energized, at block 280. The detector 130, as shown in FIG. 5, now looks for a dial tone, as shown at block 282. If there is no dial tone within seven seconds, an incoming call may have been accidentally intercepted. The system then hangs up for five seconds and tries again, as shown at block 283.

If a dial tone is detected, then a "7" and a "2" signal sequence, preceded by the "*" or followed by the "#", in accordance with the setting of the A/B position of the switch 120, is transmitted onto the line, as shown at block 284. Detector 130 then monitors for a dial tone or a busy signal for the next seven seconds, as shown at block 286. If a busy signal occurs, as is the case when the telephone company's central office computer is overloaded, the system hangs up and attempts to re-enter the "72" signals.

This sequence is repeated indefinitely until a dial tone is finally obtained. After a one second delay, as shown at block 288, the system transmits the number onto the telephone line, as shown at 290. After a five second wait, as shown at 292, the system hangs up for five seconds and repeats the entire foregoing sequence to reprogram the last number stored in memory a second time, as shown at blocks 294 and 296. This repeat of the procedure twice is required to properly register the new number at the telephone company's central office computer.

Accordingly, a summary of the operation is as follows:

When a call comes into the system, it will determine the number of rings received. If four rings are received, it means that the system was not enabled for call forwarding. As a result, it will generate three beeps so the remote user will that it is ready to receive the new call forwarding number. The call forwarding number will be received, after which the octothorpe is dialed. The two digit security code is received, after which an asterisk is dialed. The user again hears a beep to know that everything has been properly received. The system will then reprogram itself with call forwarding initiate signal followed by the new call forwarding number.

If, on the other hand, less than four rings are heard, and specifically one or two rings, then the system previously was initiated for call forwarding. It will first generate a call forwarding terminate signal. After that, it will wait to receive a second call within thirty seconds. When the second call occurs, it will again generate the beeps to the user to let him know that he can now insert the new number. The procedure then continues.

A number of security measures are also built in. The number previously programmed will automatically be reprogrammed when any of the following events occur. If, after disabling call forwarding no further rings occur within the next thirty seconds, the previous number will be reprogrammed. Likewise, if there is more than a twenty second delay between digits as a new telephone number is being programmed into the system, it will again reprogram the previous number.

If more than twenty digits are entered, it will also reprogram the previous number. If no security code is entered, it will also reprogram the previous number. Likewise, if a wrong security code is entered up to four times, it will reprogram the previous number. If this happens more than four times, it will disable the entire system.

Should the remote user want to disable call forwarding, he proceeds in an identical manner. However, when the time comes to enter a new number, instead of entering the new number, all the user does is enter the octothorpe ("#") key. The user will then hear three more beeps. The security code is entered, followed by the asterisk key. The final accepting beeps are heard and the user can then hang up.

Effectively, the user has entered no number in the memory. The system will then reprogram a call forward initiate signal. However, the number that it sends out will be no number at all. As a result, no call forwarding will take place since there is no number to which it can be forwarded to and effectively call forwarding has been turned off.

Figure 3:
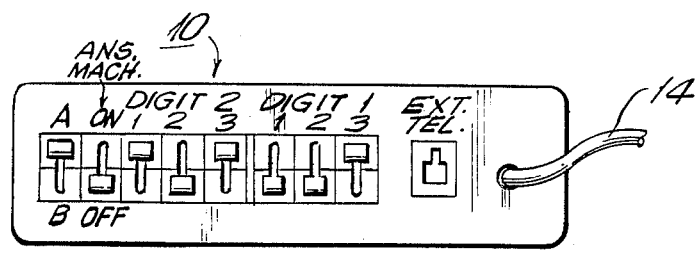
FIG. 3 is a rear view of the device shown in FIG. 1 and specifically showing the setting of the security code.

Referring now to FIG. 3, the setting of the security code will not be described. At the back of the unit as shown in FIG. 1, there are a series of six switches. These are the same switches as were shown at 138 in FIG. 5. The switches are arranged in binary code so that there are three switches for each digit. In order to further encode the system, the second digit is placed first, followed by the first digit. Accordingly, the left-hand most digits shown in FIG. 3 serve to set the second digit and the rightmost three serves to set the first digit.

The digits can be set with the digit in the up position representing an on condition simulating a zero and the digit in the lower position representing an off or simulating a binary digit 1. In this manner, the digit in the left three positions representing the digit two corresponds to a binary 2. The three switches at the right for digit one represents a binary 3. Since these are reversed, the code represented in FIG. 3 represents the number "32". When the number "32" as the security code number would then be entered remotely, the system would recognize this as the proper preset security code.

It is evident, that it is easy to reset the security code and the user can reset it each time at his own will. This further provides increased security to the system so that only the user himself will know the authorized code.

There has been disclosed heretofore the best embodiment of the invention presently contemplated. However, it is to be understood that various changes and modifications may be made thereto without departing from the spirit of the invention.

We claim:

1. A device for remotely controlling call forwarding for a given telephone line, comprising:
    detecting means for detecting an incoming call to the given telephone line;
    a ring counter for counting the number of rings on said incoming call;
    detector circuit means producing a first output responsive to receiving no more than a fixed number of rings and a second output responsive to receiving more than the fixed number of rings;
    generating means responsive only to said first output for generating a call forwarding terminate code in response to an incoming call;
    sensing means for detecting a second incoming call within a preselected time of the first incoming call;
    storage means for storing a desired call forwarding telephone number; and
    reprogramming means respectively responsive to said sensing means receiving a second incoming call and to said second output for generating a call forward initiate code and thereafter reprogramming call forwarding with said stored number.

2. The device as in claim 1, wherein said first output responds to receiving 1-3 rings and said second output responds to four and more rings.

3. The device as in claim 1, and further comprising an answering machine switch for indicating that an answering machine has been coupled to the given telephone line, and wherein said detector circuit means comprises means for waiting for the absence of a ring within a pre-determined interval and thereafter producing said second output, said means for waiting being operative after said fixed number of rings having occurred to insure compatible operation with an answering machine connected in parallel therewith.

4. The device as in claim 1, and further comprising signal means for producing an acknowledgement signal on the line in response to the second output and in response to said sensing means receiving a second incoming call.

5. The device as in claim 1, and further comprising input means responsive to the second output and responsive to said sensing means receiving a second incoming call, for receiving a desired call forwarding telephone number remotely dialed onto the given telephone line and for applying it to said storage means.

6. The device as in claim 5, and further comprising signal means for generating a signal onto the line after each digit of said remotely dialed call forwarding telephone number is received to acknowledge to the dialer successful receipt of the number.

7. The device as in claim 5, wherein said input means comprise means for receiving an octothorpe DTMF signal remotely dialed onto the telephone line following the remotely dialed call forwarding telephone number.

8. The device as in claim 5, wherein said input means comprise means for receiving a preset security code remotely dialed onto the given telephone line following entry of the call forwarding telephone number prior to applying the forwarding number to said storage means.

9. The device as in claim 8, and comprising security check means responsive to said input means not receiving said security code for triggering said reprogramming means to thereby reprogram call forwarding with the last stored number.

10. The device as in claim 5, and comprising security check means responsive to the failure of said input means receiving any digits within a prefixed time interval, for triggering said reprogramming means to thereby reprogram call forwarding with the last stored number.

11. The device as in claim 5, and comprising security check means responsive to a delay of more than a prefixed time interval between any two digits received by said input means for triggering said reprogramming means to thereby reprogram call forwarding with the last number stored.

12. The device as in claim 5, and comprising security check means responsive to said input means receiving more than a prefixed number of digits in said remotely entered call forwarding number, for triggering said reprogramming means to thereby reprogram call forwarding with the last number stored.

13. The device as in claim 8, wherein said input means comprises means for receiving an asterisk DTMF signal remotely dialed onto the telephone line following the remotely dialed security code.

14. The device as in claim 13, and further comprising signal means for generating a signal onto the line after said remotely entered asterisk signal is received to acknowledge to the dialer successful receipt of the asterisk signal.

15. The device as in claim 8, wherein said reprogramming means is responsive to said input means receiving said asterisk signal to thereby reprogram call forwarding with the newly stored remotely entered call forwarding number.

16. The device as in claim 8, and comprising security check means responsive to said input means receiving a wrong security code, for triggering said reprogramming means to thereby reprogram call forwarding with the last number stored.

17. The device as in claim 16, and further comprising counter means for counting the number of times a wrong security code is received, and disable means responsive to said counter means counting a preset number for disabling the entire remote control call forwarding system.

18. The device as in claim 17, and further comprising indicator means responsive to said disabling means for advising the user of a tamper attempt.

19. The device as in claim 17, and further comprising reset means responsive to said input means receiving the preset security code for resetting said counter means prior to a fixed number of attempts to enter the wrong security code.

20. The device as in claim 8, and comprising digit switches on said device for manually setting said security code.

21. The device as in claim 20, wherein said switches are positioned in reverse order to the desired number sequence.

22. The device as in claim 1, wherein said generating means comprise switch means for terminating the telephone line, dial tone detector means for detecting dial tone with a prefixed interval, and output means for dialing the DTMF call forwarding terminate code onto the line automatically each time a call is transferred.

23. The device as in claim 22, wherein said generator means further comprises a tone detector circuit for detecting a dial tone following entry of the terminate code on the line, means responsive to said tone detector circuit detecting a busy signal for triggering said switch means to repeat the sequence of steps to generate the call forwarding terminate code.

24. The device as in claim 23, and further comprising counter means for counting the number of time a busy signal is received, and reset means for resetting the system which said counter means reaches a preset number.

25. The device as in claim 1, wherein said reprogramming means comprise dial tone detector means for detecting a dial tone, output means for dialing the DTMF call forwarding initiate code onto the line, and means for repeating the sequence for a second time.

26. The device as in claim 25, and comprising a tone detector circuit for detecting a busy signal, and means for repeating the sequence of reprogramming upon receipt of a busy signal.

27. The device as in claim 1, and further comprising housing means, a tamper attempt indicator on said housing means, a security code setting switch on said housing means, a means for coupling a telephone set in parallel therewith for local programming.

28. The device as in claim 27, and further comprising pushbutton means for activating said detecting means to permit reprogramming locally through said telephone set.

29. The device as in claim 1, and further comprising mode switch means to permit code sequences to be selected, so that in one mode control codes are preceded by one code, and in another mode said control codes are followed by another code, to enable said device to be used with various different telephone systems having different signalling requirements.

30. The device as in claim 29, wherein said one code is an asterisk ("*") code, and another code is and octothorpe ("#") code.

* * * * *